United States Patent
Buffard et al.

(12) 
(10) Patent No.: US 6,382,454 B1
(45) Date of Patent: May 7, 2002

(54) NON-STICK COATING WITH IMPROVED SCRATCH RESISTANCE

(75) Inventors: Jean-Pierre Buffard, Aix Les Bains; Michel Fontaine, Sales; Claudine Gardaz, Rumilly, all of (FR)

(73) Assignee: SEB SA (FR)

( * ) Notice: Subject to any disclaimer, the term of this patent is extended or adjusted under 35 U.S.C. 154(b) by 0 days.

(21) Appl. No.: 09/936,498

(22) PCT Filed: Mar. 14, 2000

(86) PCT No.: PCT/FR00/00616

§ 371 Date: Sep. 12, 2001

§ 102(e) Date: Sep. 12, 2001

(87) PCT Pub. No.: WO00/54895

PCT Pub. Date: Sep. 21, 2000

(30) Foreign Application Priority Data

Mar. 16, 1999 (FR) .............................. 99 03241

(51) Int. Cl.⁷ .......................... A47J 27/00; B23B 15/08; B05D 1/36; B05D 1/38
(52) U.S. Cl. .................... 220/573.1; 428/626; 427/402; 427/407.1; 427/409
(58) Field of Search .............................. 427/402, 407.1, 427/409; 428/457, 626, 421, 422; 220/573.1

(56) References Cited

U.S. PATENT DOCUMENTS

| 4,546,141 A | | 10/1985 | Gebauer |
| 4,897,439 A | * | 1/1990 | Rau et al. .................... 524/404 |
| 5,093,403 A | * | 3/1992 | Rau et al. .................... 524/404 |
| 5,536,583 A | * | 7/1996 | Roberts et al. ............. 428/457 |
| 5,562,991 A | * | 10/1996 | Tannenbaum ................ 428/421 |
| 5,846,645 A | * | 12/1998 | Yokota et al. ............... 428/327 |

FOREIGN PATENT DOCUMENTS

| EP | 0100889 | 2/1984 |
| EP | 0343282 | 11/1989 |
| EP | 0367884 | 5/1990 |
| EP | 0786290 | 7/1997 |
| WO | WO89/00757 | 1/1989 |

* cited by examiner

*Primary Examiner*—Shrive P. Beck
*Assistant Examiner*—Willaim Phillip Fletcher, III
(74) *Attorney, Agent, or Firm*—Bachman & LaPointe, P.C.

(57) ABSTRACT

A non-stick coating with improved scratch resistance comprises an undercoat applied to a substrate, coated with a primary coat comprising a fluorocarbon resin and one or more fluorocarbon resin-based outer coats, characterized in that the undercoat is exclusively constituted by the polymer oxy-1,4-phenylene-oxy-1,4-phenylene-carbonyl-1,4-phenylene, known as PEEK.

7 Claims, No Drawings

NON-STICK COATING WITH IMPROVED SCRATCH RESISTANCE

BACKGROUND OF THE INVENTION

The present invention relates to a non-stick coating with improved scratch resistance.

Non-stick coatings applied to cookware are known. Such coatings are also known to be prone to scratching.

Such coatings are routinely applied to a hard undercoat of alumina, enamel, stainless steel or polyamide-imide (PAI) to improve their scratch resistance.

In principle, that undercoat forms a barrier that prevents scratches from reaching the surface of the substrate.

SUMMARY OF THE INVENTION

The present invention aims to provide a non-stick coating with a scratch resistance that is improved over known coatings, while retaining excellent non-stick properties.

The invention provides a non-stick coating with improved scratch resistance, comprising an undercoat applied to a substrate, coated with a primary coat comprising a fluorocarbon resin and one or more fluorocarbon resin-based outer coats.

DETAILED DESCRIPTION OF THE PREFERRED EMBODIMENT(S)

The coating of the invention is characterized in that said undercoat is essentially constituted by the polymer oxy-1,4-phenylene-oxy-1,4-phenylene-carbonyl-1,4-phenylene, known as PEEK, polyetheretherketone.

The formula for this polymer is:

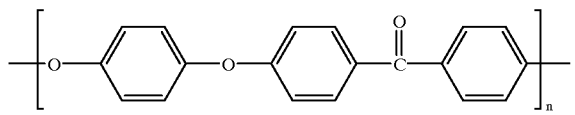

PEEK has already been used in non-stick coating formulations, mixed with a fluorocarbon resin such as polytetrafluoroethylene (PTFE).

However, PEEK has never been used without it being mixed with a fluorocarbon resin to constitute a hard undercoat.

It has surprisingly been ascertained that a non-stick coating applied to a PEEK-based undercoat exhibits improved scratch resistance.

Metal spatulas can therefore be used with the non-stick coating.

It has been ascertained that the PEEK undercoat covers 60% to 95% of the total coated surface of the substrate.

This undercoat is discontinuous and forms a very dense network that leaves 5% to 40% of the surface uncovered. The mechanical characteristics of the poly-etheretherketone associated with the configuration of this network removes scratches made by metal as metal spatulas are used.

This represents an ideal compromise that can improve both the hardness of aluminum and the elasticity of the PTFE.

It should be noted here that the network could become continuous over a rough surface, or it could cover less than 60% without having any impact on the invention.

Depending on the case, the thickness of said undercoat can be between 5 micrometers ($\mu$m) and 100 $\mu$m.

The fluorocarbon resin used in the primary coat and in the outer coat or coats is preferably polytetrafluoro-ethylene (PTFE) or a PTFE/PFA mixture.

The invention is of particular application to cookware coated externally or internally with a non-stick coating applied over an undercoat constituted by 100% PEEK.

The substrate for said cookware can be aluminum, an enameled or non-enameled steel, glass, pottery, or enamel. The support can be smooth or it can be rendered rough by mechanical or chemical treatment.

Before applying the PEEK-based undercoat, the substrate may or may not be chemically treated, for example by acid attack, or it may or may not be mechanically treated, for example by sand blasting.

The PEEK undercoat can be applied to the substrate at ambient temperature or it can be heated to about 450° C., in the form of a powder or a dispersion.

It can also be applied by screen printing or pad printing as a paste, in which case the applied undercoat may have the following composition:

| | | |
|---|---|---|
| PEEK | 30 to 400 | parts |
| Thickener | 1 to 10 | by |
| Diluent | 10 to 450 | weight |
| Water | 100 to 300 | |

All the constituents other than the PEEK disappear during curing such that after curing, the undercoat is exclusively constituted by PEEK.

The grain size of the PEEK powder used can be in the range 4 microns ($\mu$m) to 80 $\mu$m, with a mean grain size of about 20 $\mu$m.

Depending on the mode of application, it may be necessary to heat said undercoat to a temperature of at least 340° C. Then, the PTFE-based primary coat and outer coat or coats are applied to said undercoat in succession, and the coat assembly is then cured at 400° C. to 420° C.

An example will now be given of the composition of the coats that are applied in succession to the PEEK undercoat:

| Constituents | Parts by weight |
|---|---|
| PRIMARY COAT | |
| Aqueous dispersion of polyamide-imide, about 13% dry extract | 100 to 500 |
| N-methylpyrrolidone | 100 |
| PTFE dispersion, 60% dry extract | 100 to 400 |
| Water | 100 |
| Carbon black, 20% dry extract | 20–30 |
| Colloidal silica, 30% dry extract | 10–200 |
| INTERMEDIATE OUTER COAT | |
| PTFE dispersion, 60% dry extract | 80 to 90 |
| PFA 6900 dispersion, 50% dry extract | 0.5 to 5.0 |
| Distributing and film-forming agent | 1 to 20 |
| TiO$_2$-coated mica flakes | 0.1 to 0.4 |
| Derusol, "carbon black, 25% dry extract" | 0.02 to 0.6 |
| UPPERMOST OUTER COAT | |
| PTFE dispersion, 60% dry extract | 80 to 90 |
| Distributing and film-forming agent | 1 to 20 |
| TiO$_2$-coated mica flakes | 0.1 to 0.4 |

After drying, the above assembly of coats was sintered at 400° C. to 420° C. for 5 to 10 minutes.

A non-stick coating with improved properties was obtained.

Hardness measurements carried out in accordance with French standard NF 21-511 at different temperatures produced the following results and are compared with a conventional coating:

| Hardness PTFE coating with PEEK | 20° C. | 100° C. | 180° C. |
|---|---|---|---|
| Ball identation test | 3.4 kg | 3.4 kg | 1.7–2.0 kg |
| Conventional coating, no undercoat | 1.8 kg | 1.7 kg | 1.6 kg |

In particular, when used in a real food cooking situation, the performance as regards resistance to attack by metal spatulas was astonishing. After cooking, grilling and frying cycles had been carried out with different foods to correspond to 2 years of use, the coating surface was hardly scratched, and the metal had not been reached.

This constitutes the first coating plus undercoat system that genuinely provides improved scratch resistance when used with metal utensils (with the exception of knives); until now, none of the undercoats tested provided a satisfactory solution (plasma, alumina, titanium, anodizing, and other surface treatments).

Clearly, this improvement in scratch resistance can be applied in all fields, providing external and internal coatings for cookware and household electrical appliances: hotplates, grill plates and other smooth surfaces, such as irons.

Clearly, the invention is not limited to the example described above and many modifications can be made in this regard without departing from the spirit and ambit of the invention.

What is claimed is:

1. A non-stick coating with improved scratch resistance, comprising an undercoat applied to a substrate, a primary coat comprising a fluorocarbon resin applied to said undercoat and at least one fluorocarbon resin-based outer coats applied to said primary coat, and, after curing, said undercoat being exclusively constituted by the polymer oxy-1,4-phenylene-oxy-1,4-phenylene-carbonyl-1,4-phenylene, known as PEEK.

2. A coating according to claim 1, wherein the undercoat constituted by said PEEK covers 60% to 95% of the total coated surface of the substrate.

3. A coating according to claim 1, wherein the thickness of said undercoat is in the range of 5 $\mu$m to 100 $\mu$m.

4. A coating according to claim 1, wherein said fluorocarbon resin is polytetrafluoroethylene (PTFE) or a PTFE-PFA (perfluoroalkyl vinyl ether) mixture.

5. Cookware coated with a coating comprising an undercoat applied to a substrate, a primary coat comprising a fluorocarbon resin applied to said undercoat and at least one fluorocarbon resin-based outer coats applied to said primary coat, and, after curing, said undercoat being exclusively constituted by the polymer oxy-1,4-phenylene-oxy-1,4-phenylene-carbonyl-1,4-phenylene, known as PEEK.

6. A method of applying a coating to a substrate, comprising the steps of:

applying an undercoat constituted by polymer oxy-1,4-phenylene-oxy-1,4-phenylene-carbonyl-1,4-phenylene, known as PEEK to the substrate;

fusing said undercoat at a temperature of at least 340° C.;

applying a polytetrafluoroethylene-based primary coat and at least one outer coat in succession to said undercoat; and curing the coats at a temperature in the range of 400–420° C. wherein, after curing, said undercoat being exclusively constituted by the polymer oxy-1,4-phenylene-oxy-1,4-phenylene-carbonyl-1,4-phenylene, known as PEEK.

7. A method according to claim 6, wherein said step of applying said PEEK comprises applying the PEEK in the form of a powder with a grain size in the range of 4 $\mu$m to 80 $\mu$m and a mean grain size of about 20 $\mu$m.

* * * * *